United States Patent [19]

Masumoto et al.

[11] 4,065,330

[45] Dec. 27, 1977

[54] WEAR-RESISTANT HIGH-PERMEABILITY ALLOY

[75] Inventors: Hakaru Masumoto, Sendai; Yuetsu Murakami, Izumi, both of Japan

[73] Assignee: The Foundation: The Research Institute of Electric and Magnetic Alloys

[21] Appl. No.: 770,267

[22] Filed: Feb. 22, 1977

Related U.S. Application Data

[63] Continuation-in-part of Ser. No. 604,995, Aug. 15, 1975, abandoned.

[30] Foreign Application Priority Data

| | | |
|---|---|---|
| Sept. 26, 1974 | Japan | 49-110881 |
| Mar. 7, 1975 | Japan | 50-27864 |
| Apr. 4, 1975 | Japan | 50-41082 |

[51] Int. Cl.$^2$ ........................ C04B 35/00; C22C 38/06

[52] U.S. Cl. .................................. 148/31.55; 75/124; 148/100; 148/121

[58] Field of Search ............................ 75/124, 128 E; 148/31.55, 31.57, 100, 101, 121

[56] References Cited

U.S. PATENT DOCUMENTS

| | | | |
|---|---|---|---|
| 2,193,768 | 3/1940 | Masumoto et al. | 75/124 |
| 2,861,908 | 11/1958 | Mickelson et al. | 75/128 E |
| 3,711,340 | 1/1973 | Korchynsky et al. | 75/124 |
| 3,852,063 | 12/1974 | Niimi et al. | 75/124 |
| 3,960,616 | 6/1976 | Evans et al. | 148/31.55 |

*Primary Examiner*—Walter R. Satterfield
*Attorney, Agent, or Firm*—Hill, Gross, Simpson, Van Santen, Steadman, Chiara & Simpson

[57] ABSTRACT

A heat treated, wear-resistant high-permeability alloy consisting of Si, Al, at least one element selected from Y and La series elements and Fe, and a heat treated, wear-resistant high-permeability alloy consisting of Si, Al, at least one element selected from Y and La series elements and Fe as main ingredients and containing at least one element selected from the group consisting of V, Nb, Ta, Cr, Mo, W, Cu, Ge, Ti, Ni, Co, Mn, Zr, Sn, Sb, Be and Pb as subingredients, have an initial permeability of more than 1,000, a maximum permeability of more than 3,000, a hardness of more than 490 (Hv) and an average grain size of smaller than 2 mm, and are particularly suitable as a magnetic material for magnetic heads in magnetic recording and reproducing systems.

12 Claims, 6 Drawing Figures

WEAR-RESISTANT HIGH-PERMEABILITY ALLOY

Figure 1:
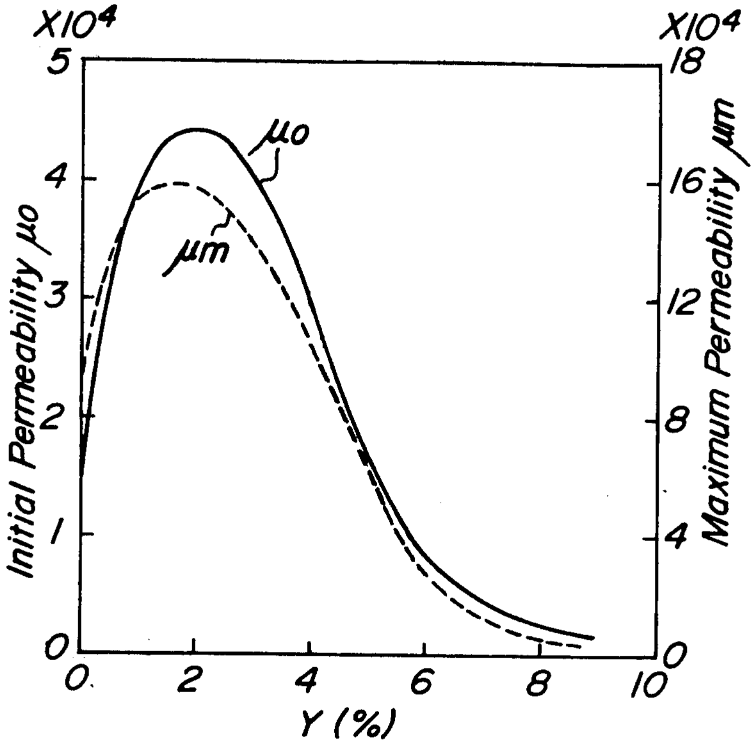

This application is a continuation-in-part of the co-pending application Ser. No. 604,995 filed Aug. 15, 1975 and now abandoned.

The present invention relates to wear-resistant high-permeability alloys, and more particularly to wear-resistant high-permeability alloys comprising silicon, aluminum, at least one element selected from yttrium and lanthanum series elements, and iron.

The term "lanthanum series elements" used herein means to include lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) and lutetium (Lu).

The inventors have previously discovered that iron-silicon-aluminum alloys have a high permeability and are called as Sendust because they are brittle and are apt to become more powdery (Japanese Patent Application Publication No. 2,409/33, No. 4,721/39, No. 4,722/39, No. 4,723/39 and No. 4,724/39). At present, Sendust is largely used as an alloy for the manufacture of magnetic heads in magnetic recording systems, particularly video tape recorder (VTR), because it has excellent magnetic properties, high hardness and good wear resistance. However, in such Sendust there are drawbacks that the composition range showing a high permeability is very narrow and that it is brittle due to the coarse grain size so that crack and the like are apt to be caused during the manufacture of magnetic heads.

In advance with magnetic recording techniques, Sendust tends to be widely used as a magnetic alloy for magnetic heads in magnetic recording and reproducing systems in addition to VTR. Consequently, it is desired not only to improve the above mentioned drawbacks of Sendust, but also to develop new and easily producible Sendust series alloys having improved magnetic properties and wear resistance. Moreover, alloys for the manufacture of such magnetic heads are generally required to have an initial permeability of more than 1,000 and a maximum permeability of more than 3,000.

Therefore, an object of the invention is to provide wear-resistant high-permeability alloys having excellent magnetic properties, high hardness and fine grain size.

The inventors have made various studies with respect to the Sendust series alloys and found out that alloys comprising iron, silicon, aluminum and at least one element selected from yttrium and lanthanum series elements as will be mentioned below have excellent wear resistance, high permeabilities, high hardness and fine grain size as compared with the well-known Sendust.

Namely, the present invention provides heat treated, wear-resistant high-permeability alloys having an initial permeability of more than 1,000 and a maximum permeability of more than 3,000, a hardness of more than 490 (Hv) and an average grain size of smalller than 2 mm, which are preferably suitable as magnetic materials for the manufacture of magnetic recording systems requiring high permeability and wear resistance.

According to an embodiment of the invention, the alloy consists of by weight 3–13% of silicon, 3–13% of aluminum, 0.01–7% of at least one element selected from yttrium and lanthanum series elements and remainder of iron. The preferable alloy consists of by weight 5–12% of silicon, 4–8% of aluminum, 0.05–6% of at least one element selected from yttrium and lanthanum series elements and remainder of iron.

According to the invention, a most preferable alloy is a combination of silicon, aluminum, iron and an element selected from yttrium, cerium and lanthanum.

According to another embodiment of the invention, the alloy consists of by weight 3–13% of silicon, 3–13% of aluminum, 0.01–7% of at least one element selected from yttrium and lanthanum series elements and remainder of iron as main ingredients, and further contains at least one element selected from the group consisting of 0–5% of vanadium, 0–5% of niobium, 0–5% of tantalum, 0–5% of chromium, 0–5% of molybdenum, 0–5% of tungsten, 0–5% of copper, 0–5% of germanium, 0–5% of titanium, 0–7% of nickel, 0–7% of cobalt, 0–7% of manganese, 0–3% of zirconium, 0–3% of tin, 0–3% of antimony, 0–3% of beryllium and 0–0.3% of lead as subingredients, said subingredients in total being in a range of 0.01–7% by weight of the total alloy. The preferable alloy consists of by weight 5–12% of silicon, 4–8% of aluminum, 0.05–6% of at least one element selected from yttrium and lanthanum series elements and remainder of iron as main ingredients, and further contains at least one element selected from the group consisting of 0–4% of vanadium, 0–4% of niobium, 0–4% of tantalum, 0–4% of chromium, 0–4% of molybdenum, 0–4% of tungsten, 0–4% of copper, 0–4% of germanium, 0–4% of titanium, 0–5% of nickel, 0–5% of cobalt, 0–5% of manganese, 0–2% of zirconium, 0–2% of tin, 0–2% of antimony, 0–2% of beryllium and 0–0.2% of lead as subingredients, said subingredients in total being in a range of 0.01–7% by weight of the total alloy.

In order to make the alloy of the present invention, suitable amounts of starting materials selected from the above mentioned elements are firstly melted by means of a suitable melting furnace in air, preferably in a non-oxidizing atmosphere or in vacuo and then added with a small amount (less than 1%) of a deoxidizer and a desulfurizer such as manganese, titanium, calcium alloy, magnesium alloy and the like to remove imurities as far as possible. Thereafter, the resulting molten mass is thoroughly stirred to homogenize its composition and then poured into a mold having appropriate shape and size to form a sound ingot. This ingot is further shaped by polishing, electric spark forming, electrolytic polishing or the like to make a desirable shaped article. Alternatively, the ingot is further pulverized into a fine powder and shaped under a pressure in a suitable manner with or without a proper binder to obtain a desirable shaped article. Moreover, the ingot may be shaped by forging or rolling to make a desirable shaped article.

The thus obtained shaped article is heated in a casting or sputtering state or in hydrogen or other suitable non-oxidizing atmosphere or in vacuo at a temperature above its recrystallization temperature (about 600° C) and below its melting point and then cooled at a suitable rate to obtain a heat treated, wear-resistant high-permeability alloy having high hardness and fine grain size.

Figure 2:
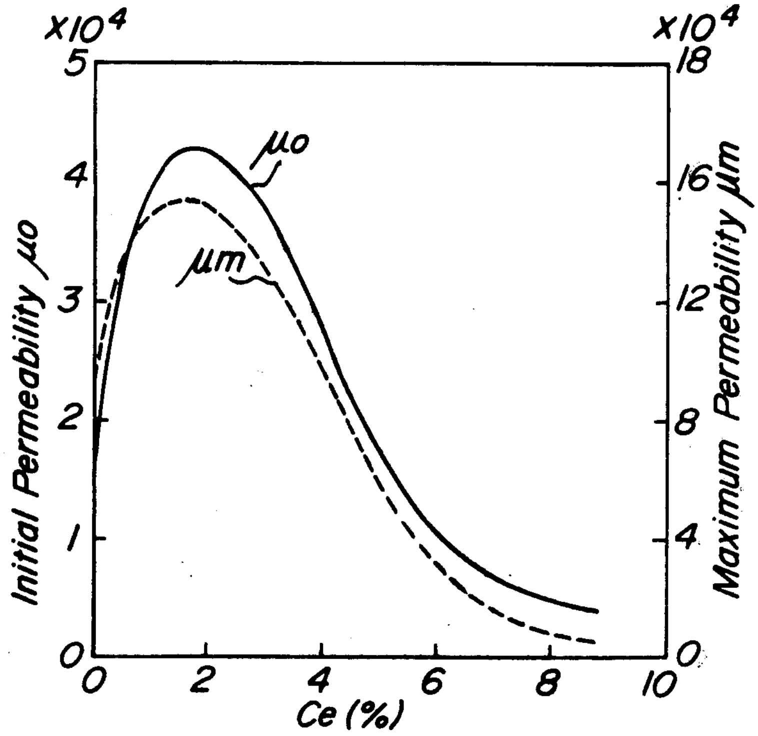
Figure 3:
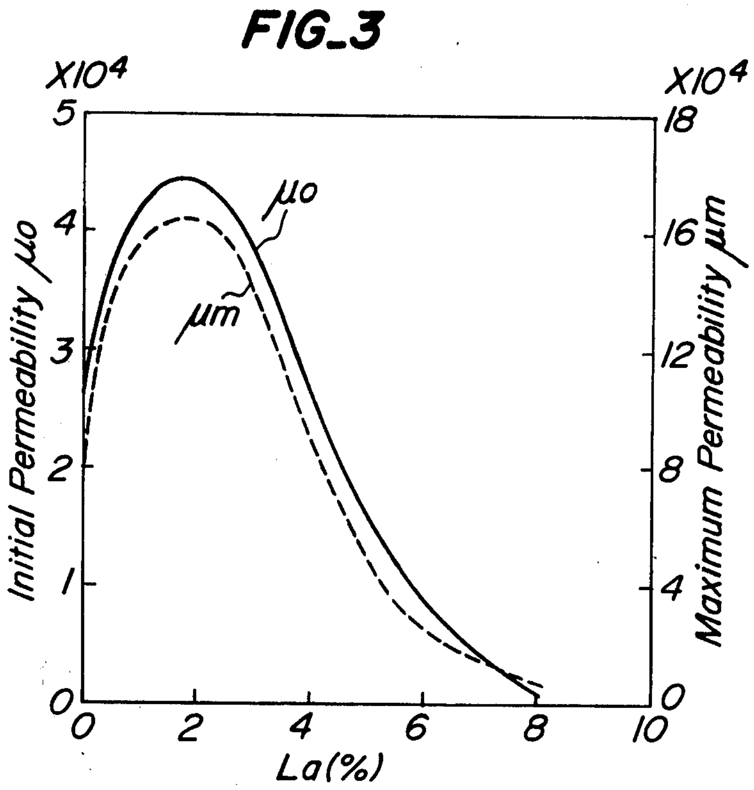
Figure 4:
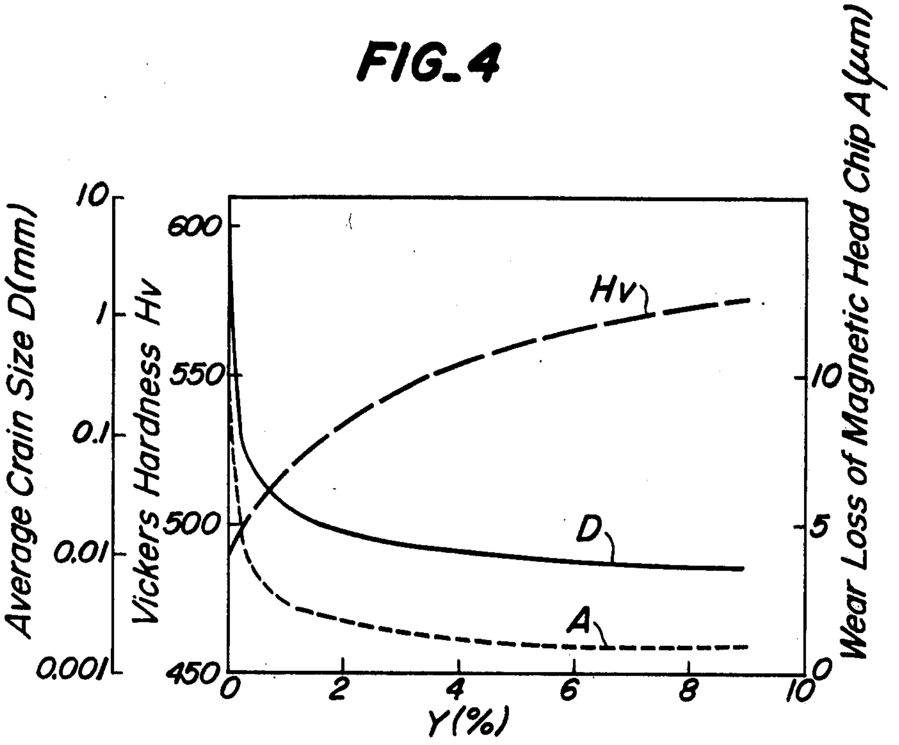
Figure 5:
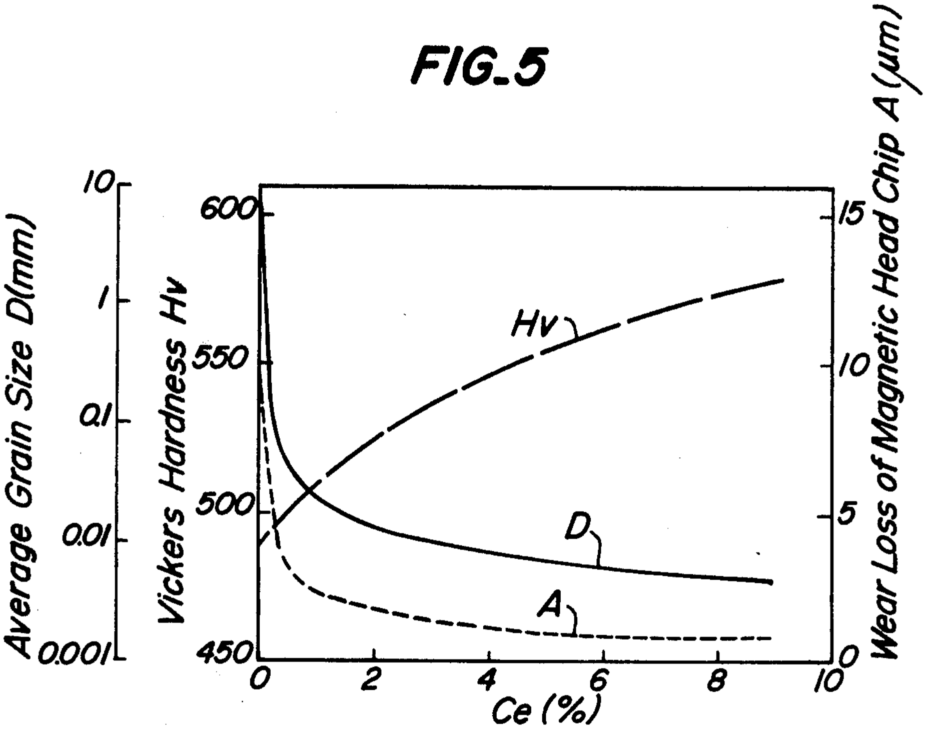
Figure 6:
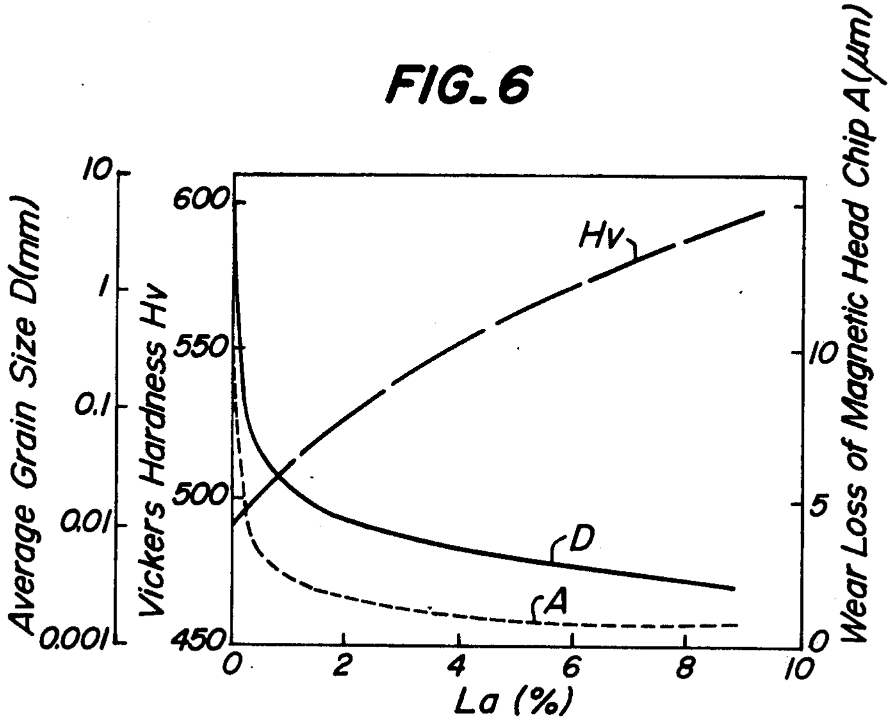

For a better understanding of the invention, reference is made to the accompanying drawings, in which:

FIGS. 1, 2 and 3 are graphs showing a relation between the addition amount of yttrium, cerium and lanthanum and the initial and maximum permeabilities in 10.0% Si-5.5% Al-Fe series alloys, respectively; and FIGS. 4, 5 and 6 are graphs showing a relation between the addition amount of yttrium, cerium and lanthanum and Vickers hardness, average grain size and wear loss of magnetic head chip after a magnetic tape is run for 50 hours in 10.0% Si-5.5% Al-Fe series alloys, respectively.

Then, the thus obtained sheet was subjected to several heat treatments to obtain characteristic features as shown in the following Table 1.

Table 1

| Heat treatment | Initial permeability (μ0) | Maximum permeability (μm) | Hardness (Hv) | Average grain size (mm) |
|---|---|---|---|---|
| After heated in hydrogen atmosphere at 700° C for 10 hours, cooled to room temperature at speed of 100° C/hour | 20,800 | 51,600 | 540 | 0.010 |
| After heated in hydrogen atmosphere at 800° C for 5 hours, cooled to room temperature at speed of 240° C/hour | 25,400 | 73,000 | 538 | 0.011 |
| After heated in hydrogen atmosphere at 900° C for 3 hours, cooled to room temperature at speed of 100° C/hour | 31,700 | 115,500 | 535 | 0.012 |
| After heated in hydrogen atmosphere at 1,000° C for 2 hours, cooled to room temperature at speed of 100° C/hour | 38,000 | 143,700 | 533 | 0.012 |
| After heated in hydrogen atmosphere at 1,100° C for 2 hours, coold to room temperature at speed of 240° C/hour | 43,800 | 158,000 | 530 | 0.013 |
| After heated in hydrogen atmosphere at 1,200° C for 1 hour, cooled to room temperature at speed of 240° C/hour | 40,500 | 142,000 | 525 | 0.015 |

The following examples are given in illustration of the invention and are not intended as limitations thereof.

EXAMPLE 1

Preparation of Alloy Specimen No. 19 (Fe: 82,7%, Si: 10.0%, Al: 5.5%, Y: 1.8%)

As a starting material, silicon of 99.8% purity, and aluminum, yttrium and electrolytic iron of 99.9% purity were used. The starting materials were charged in a total amount of 6 kg into an alumina crucible and melted in a high frequency induction electric furnace in vacuo and then thoroughly stirred to obtain a homogeneous molten alloy. Then, the thus obtained melt was poured into a mold having a hole of 50 mm side and 200 mm height to form an ingot. This ingot was shaped by polishing and electric spark forming to obtain an annular sheet having an outer diameter of 23 mm, an inner diameter of 15 mm and a thickness of 0.3 mm.

EXAMPLE 2

Preparation of Alloy Specimen No. 27 (Fe: 82.3%, Si: 9.3%, Al: 5.4%, Y: 3.0%)

As a starting material, electrolytic iron, silicon, aluminum and yttrium of the same purities as in Example 1 were used. The starting materials were charged in a total amount of 100 g into an alumina crucible and melted in a high frequency induction electric furnace in vacuo and then thoroughly stirred to obtain a homogeneous molten alloy. Then, the thus obtained melt was poured into a mold having an annular hole of 40 mm outer diameter, 30 mm inner diameter and 10 mm height to obtain an annular ingot.

Then, the thus obtained ingot was subjected to several heat treatments to obtain characteristic features as shown in the following Table 2.

Moreover, characteristic features of representative Fe-Si-Al-Y series alloys are shown in the following Table 3.

Table 2

| Heat treatment | Initial permeability (μ0) | Maximum permeability (μm) | Hardness (Hv) | Average grain size (mm) |
|---|---|---|---|---|
| Casting state | 10,700 | 28,600 | 555 | 0.009 |
| After heated in hydrogen atmosphere at 700° C for 10 hours, cooled to room temperature at speed of 100° C/hour | 13,500 | 33,500 | 550 | 0.010 |
| After heated in hydrogen atmosphere at 900° C for 5 hours, cooled to room temperature at speed of 240° C/hour | 19,700 | 56,000 | 547 | 0.11 |
| After heated in hydrogen atmosphere at 1,000° C for 3 hours, cooled to room temperature at speed of 50° C/hour | 28,600 | 97,500 | 545 | 0.11 |
| After heated in hydrogen atmosphere at 1,100° C for 2 hours, cooled to room temperature at speed of 240° C/hour | 34,000 | 126,000 | 544 | 0.012 |
| After heated in hydrogen atmosphere at 1,200° C for 2 hours, cooled to room temperature at speed of 100° C/hour | 31,500 | 105,100 | 541 | 0.014 |

Table 3(a)

| Specimen No. | Fe (%) | Si (%) | Al (%) | Y (%) | Subingredients (%) | Heated condition Temperature (° C) | Time (hr) | Cooling rate (° C/hr) | Initial permeability (μ0) | Maximum permeability (μm) | Hardness (Hv) | Average grain size (mm) |
|---|---|---|---|---|---|---|---|---|---|---|---|---|
| 5 | 84.9 | 9.8 | 5.2 | 0.1 | — | 1,150 | 2 | 240 | 38,500 | 132,000 | 493 | 1.000 |
| 8 | 83.8 | 9.7 | 6.0 | 0.5 | — | " | 3 | 100 | 40,600 | 136,500 | 505 | 0.050 |
| 12 | 83.2 | 10.3 | 5.8 | 0.7 | — | " | 5 | " | 41,000 | 126,300 | 510 | 0.030 |
| 15 | 83.4 | 10.2 | 5.3 | 1.1 | — | 1,100 | 2 | 300 | 42,100 | 147,100 | 520 | 0.020 |
| 19 | 82.7 | 10.0 | 5.5 | 1.8 | — | " | 2 | 240 | 43,800 | 158,000 | 530 | 0.013 |
| 24 | 82.5 | 9.6 | 5.7 | 2.2 | — | 1,150 | 2 | " | 41,300 | 139,400 | 535 | 0.012 |
| 27 | 82.3 | 9.3 | 5.4 | 3.0 | — | 1,100 | 2 | " | 34,000 | 126,000 | 544 | 0.012 |
| 32 | 80.1 | 10.0 | 4.7 | 5.2 | — | " | 3 | 100 | 15,600 | 64,000 | 560 | 0.010 |
| 40 | 82.6 | 9.5 | 5.6 | 1.2 | 1.1 V | 1,150 | 3 | " | 44,900 | 158,000 | 530 | 0.022 |
| 44 | 82.7 | 9.2 | 5.8 | 0.8 | 1.5 Nb | 1,100 | 2 | 500 | 39,200 | 165,700 | 528 | 0.025 |
| 50 | 80.7 | 10.3 | 5.0 | 2.0 | 2.0 Ta | 1,200 | 2 | " | 40,700 | 174,000 | 543 | 0.018 |
| 56 | 81.1 | 9.7 | 6.2 | 1.5 | 1.5 Cr | 1,100 | 2 | 300 | 44,300 | 135,000 | 528 | 0.020 |
| 63 | 81.8 | 10.0 | 5.5 | 1.2 | 1.5 Mo | 1,150 | 3 | " | 45,700 | 182,000 | 525 | 0.015 |
| 68 | 81.1 | 9.5 | 5.2 | 1.7 | 2.5 W | 1,100 | 2 | 240 | 38,600 | 177,000 | 530 | 0.013 |
| 76 | 80.6 | 9.3 | 5.6 | 1.5 | 3.0 Ni | 1,200 | 1 | 300 | 44,100 | 145,800 | 532 | 0.014 |
| 80 | 80.0 | 10.5 | 5.5 | 2.0 | 2.0 Cu | 1,100 | 3 | " | 38,500 | 161,000 | 535 | 0.011 |
| 84 | 78.7 | 9.6 | 6.2 | 2.5 | 3.0 Co | 1,050 | 3 | 100 | 35,700 | 173,500 | 542 | 0.010 |
| 92 | 79.7 | 9.3 | 6.0 | 1.0 | 4.0 Mn | 1,100 | 2 | " | 37,100 | 171,000 | 520 | 0.014 |

Table 3(b)

| Specimen No. | Fe (%) | Si (%) | Al (%) | Y (%) | Subingredients (%) | Heated condition Temperature (° C) | Time (hr) | Cooling rate (° C/hr) | Initial permeability (μ0) | Maximum permeability (μm) | Hardness (Hv) | Average grain size (mm) |
|---|---|---|---|---|---|---|---|---|---|---|---|---|
| 100 | 81.7 | 9.5 | 5.8 | 1.5 | 1.5 Ge | 1,100 | 2 | 50 | 44,500 | 135,700 | 532 | 0.025 |
| 106 | 81.6 | 10.1 | 6.0 | 1.3 | 1.0 Ti | " | 2 | " | 44,800 | 125,400 | 545 | 0.015 |
| 112 | 83.0 | 9.4 | 5.3 | 1.8 | 0.5 Zr | " | 3 | 10 | 35,700 | 106,000 | 557 | 0.025 |
| 121 | 82.9 | 10.0 | 5.0 | 1.6 | 0.5 Sn | " | 1 | 50 | 32,600 | 88,100 | 542 | 0.021 |
| 128 | 82.0 | 9.2 | 6.3 | 2.0 | 0.5 Sb | " | 2 | 240 | 34,900 | 105,000 | 555 | 0.016 |
| 135 | 83.0 | 9.7 | 5.7 | 1.3 | 0.3 Be | 1,050 | 3 | 500 | 27,600 | 83,500 | 550 | 0.018 |
| 139 | 83.9 | 9.0 | 5.5 | 1.5 | 0.1 Pb | 1,100 | 2 | 240 | 36,400 | 117,000 | 523 | 0.010 |
| 146 | 80.4 | 9.6 | 5.4 | 2.1 | 0.5 V, 0.5 Mo, 1.0 Mn, 0.5 Ti | " | 2 | 100 | 45,600 | 178,000 | 547 | 0.013 |
| 155 | 80.0 | 10.0 | 6.2 | 1.7 | 0.5 Nb, 1.0 Cr, 0.3 Mn, 0.3 Zr | " | 3 | 10 | 43,100 | 126,000 | 552 | 0.018 |
| 161 | 78.9 | 10.2 | 5.5 | 1.4 | 1.5 Ta, 1.0 W, 1.0 Cr, 0.5 Sn | " | 5 | 50 | 37,000 | 108,400 | 543 | 0.022 |
| 174 | 79.4 | 9.5 | 4.8 | 2.3 | 1.0 Mo, 2.0 Co, 0.5 Mn, 0.5 Sb | " | 3 | " | 36,000 | 173,000 | 548 | 0.015 |
| 182 | 80.3 | 8.8 | 6.1 | 1.7 | 2.5 Ni, 0.5 Zr, 0.1 Pb | " | 2 | " | 34,800 | 94,300 | 545 | 0.013 |
| Sendust | 85.0 | 9.6 | 5.4 | — | — | " | 3 | 100 | 35,000 | 118,000 | 490 | 5.000 |

EXAMPLE 3

Preparation of Alloy Specimen No. 206 (Fe: 82.8%, Si: 9.7%, Al: 5.7%, Ce: 1.8%)

As a starting material, electrolytic iron, silicon and aluminum of the same purities as in Example 1 and cerium of 99.9% purity were used. The specimen was prepared in the same manner as described in Example 1 and then subjected to several heat treatments to obtain characteristic features as shown in the following Table 4.

Table 4

| Heat treatment | Initial permeability (μ0) | Maximum permeability (μm) | Hardness (Hv) | Average grain size (mm) |
|---|---|---|---|---|
| After heated in hydrogen atmosphere at 700° C for 10 hours, cooled to room temperature at speed of 100° C/hour | 13,500 | 56,000 | 530 | 0.008 |
| After heated in hydrogen atmosphere at 800° C for 5 hours, cooled to room temperature at speed of 240° C/hour | 24,000 | 87,500 | 525 | 0.008 |
| After heated in hydrogen atmosphere at 900° C for 3 hours, cooled to room temperature at speed of 100° C/hour | 32,200 | 102,000 | 523 | 0.009 |
| After heated in hydrogen atmosphere at 1,000° C for 2 hours, cooled to room temperature at speed of 100° C/hour | 38,000 | 136,000 | 520 | 0.010 |
| After heated in hydrogen atmosphere at 1,100° C for 3 hours, cooled to room temperature at speed of 150° C/hour | 42,100 | 148,000 | 518 | 0.010 |
| After heated in hydrogen atmosphere at 1,200° C for 1 hour, cooled to room temperature at speed of 240° C/hour | 40,800 | 135,000 | 517 | 0.015 |

EXAMPLE 4

Preparation of Alloy Specimen No. 212 (Fe: 81.9%, Si: 9.6%, Al: 5.5%, Ce: 3.0%)

As a starting material, electrolytic iron, silicon, aluminum and cerium of the same purities as in Example 3 were used. The specimen was prepared in the same manner as described in Example 2 and then subjected to several heat treatments to obtain characteristic features as shown in the following Table 5.

Moreover, characteristic features of representative Fe-Si-Al-Ce series alloys are shown in the following Table 6.

Table 5

| Heat treatment | Initial permeability (μ0) | Maximum permeability (μm) | Hardness (Hv) | Average grain size (mm) |
|---|---|---|---|---|
| Casting state | 10,400 | 34,200 | 543 | 0.005 |
| After heated in hydrogen atmosphere at 700° C for 10 hours, cooled to room temperature at speed of 100° C/hour | 13,500 | 47,000 | 540 | 0.005 |
| After heated in hydrogen atmosphere at 900° C for 5 hours, cooled to room temperature at speed of 240° C/hour | 28,000 | 79,000 | 535 | 0.007 |
| After heated in hydrogen atmosphere at 1,000° C for 3 hours, cooled to room temperature at speed of 150° C/hour | 34,600 | 102,500 | 530 | 0.007 |
| After heated in hydrogen atmosphere at 1,100° C for 2 hours, cooled to room temperature at speed of 240° C/hour | 37,200 | 116,000 | 527 | 0.008 |
| After heated in hydrogen atmosphere at 1,200° C for 2 hours, cooled to room temperature at speed of 100° C/hour | 35,800 | 109,000 | 525 | 0.009 |

Table 6(a)

| Specimen No. | Fe (%) | Si (%) | Al (%) | Ce (%) | Subingredients (%) | Heated condition: Temperature (° C) | Heated condition: Time (hr) | Cooling rate (° C/hr) | Initial permeability (μ0) | Maximum permeability (μm) | Hardness (Hv) | Average grain size (mm) |
|---|---|---|---|---|---|---|---|---|---|---|---|---|
| 190 | 84.9 | 9.6 | 5.4 | 0.1 | — | 1,150 | 2 | 240 | 35,700 | 122,000 | 494 | 0.90 |
| 196 | 83.7 | 9.9 | 5.9 | 0.5 | — | " | 2 | 100 | 36,300 | 135,000 | 501 | 0.061 |
| 201 | 83.6 | 10.0 | 5.4 | 1.0 | — | " | 2 | 100 | 38,500 | 143,600 | 510 | 0.016 |
| 206 | 82.8 | 9.7 | 5.7 | 1.8 | — | 1,100 | 3 | 150 | 42,100 | 148,000 | 518 | 0.010 |
| 212 | 81.9 | 9.6 | 5.5 | 3.0 | — | " | 2 | 240 | 37,200 | 116,000 | 527 | 0.008 |
| 217 | 80.7 | 9.3 | 4.5 | 5.5 | — | " | 3 | 100 | 15,000 | 63,000 | 550 | 0.006 |
| 223 | 82.4 | 9.6 | 5.5 | 1.5 | 1.0 V | " | 5 | 100 | 34,600 | 135,000 | 523 | 0.014 |
| 227 | 82.4 | 9.4 | 5.7 | 1.0 | 1.5 Nb | " | 3 | 50 | 38,200 | 126,000 | 530 | 0.012 |
| 230 | 81.6 | 9.7 | 5.2 | 2.0 | 1.5 Ta | " | 2 | 100 | 41,000 | 121,500 | 525 | 0.010 |
| 235 | 82.4 | 9.1 | 6.0 | 1.5 | 1.0 Cr | 1,050 | 3 | 240 | 43,500 | 133,000 | 513 | 0.015 |
| 241 | 81.1 | 9.6 | 5.8 | 2.0 | 1.5 Mo | " | 3 | 240 | 42,200 | 124,000 | 521 | 0.008 |
| 245 | 82.5 | 8.2 | 4.8 | 1.5 | 3.0 W | 1,100 | 3 | 100 | 41,010 | 113,000 | 518 | 0.011 |
| 250 | 80.2 | 9.2 | 5.1 | 2.5 | 3.0 Ni | " | 2 | 50 | 34,000 | 125,000 | 525 | 0.009 |
| 254 | 80.5 | 9.7 | 5.6 | 1.7 | 2.5 Cu | " | 3 | 240 | 35,000 | 132,000 | 520 | 0.011 |
| 258 | 79.7 | 9.3 | 5.8 | 2.2 | 3.0 Co | " | 2 | 400 | 28,000 | 125,000 | 518 | 0.013 |
| 263 | 81.6 | 8.4 | 5.2 | 1.8 | 3.0 Mn | " | 3 | 50 | 36,000 | 119,000 | 515 | 0.012 |
| 270 | 81.8 | 9.2 | 5.3 | 2.2 | 1.5 Ge | " | 3 | 240 | 45,100 | 153,000 | 526 | 0.009 |
| 274 | 83.0 | 9.3 | 5.2 | 1.0 | 1.5 Ti | 1,150 | 2 | 100 | 33,500 | 124,600 | 538 | 0.011 |

Table 6(b)

| Specimen No. | Fe (%) | Si (%) | Al (%) | Ce (%) | Subingredients (%) | Heated condition: Temperature (° C) | Heated condition: Time (hr) | Cooling rate (° C/hr) | Initial permeability (μ0) | Maximum permeability (μm) | Hardness (Hv) | Average grain size (mm) |
|---|---|---|---|---|---|---|---|---|---|---|---|---|
| 277 | 81.9 | 9.6 | 5.9 | 1.6 | 1.0 Zr | 1,150 | 3 | 100 | 35,200 | 131,000 | 535 | 0.013 |
| 282 | 82.5 | 9.3 | 5.0 | 2.0 | 1.2 Sn | " | 3 | 240 | 32,700 | 120,100 | 540 | 0.010 |
| 290 | 81.7 | 9.0 | 6.0 | 2.5 | 0.8 Sb | " | 2 | 50 | 34,300 | 124,600 | 537 | 0.007 |
| 296 | 82.7 | 9.3 | 6.2 | 1.5 | 0.3 Be | " | 2 | 100 | 36,100 | 103,500 | 528 | 0.014 |
| 302 | 81.9 | 9.2 | 5.8 | 3.0 | 0.1 Pb | " | 2 | 100 | 32,500 | 124,000 | 525 | 0.012 |
| 305 | 80.8 | 10.1 | 4.6 | 2.0 | 0.5 V, 0.5 Mo, 1.0 Mn, 0.5 Ti | 1,100 | 3 | 240 | 38,000 | 127,200 | 531 | 0.016 |
| 309 | 79.9 | 9.6 | 5.8 | 2.3 | 0.5 Nb, 1.0 Cr, 0.5 Mn, 0.3 Zr, 0.1 Pb | " | 3 | 400 | 37,500 | 125,000 | 526 | 0.014 |
| 312 | 79.5 | 9.5 | 4.9 | 1.8 | 2.0 Ta, 1.0 W, 1.0 Co, 0.3 Sn | " | 2 | 50 | 40,300 | 127,000 | 522 | 0.020 |
| 318 | 80.5 | 9.0 | 5.6 | 2.2 | 0.5 Nb, 2.0 Cu, 0.2 Be | " | 2 | 10 | 42,100 | 119,500 | 540 | 0.013 |
| 325 | 80.2 | 8.8 | 6.0 | 1.5 | 1.0 Mo, 2.0 Cu, 0.5 Ge | " | 2 | 400 | 37,600 | 105,000 | 527 | 0.022 |
| 329 | 80.8 | 9.2 | 5.3 | 2.4 | 1.5 Ni, 0.3 Mn, 0.5 Sb | " | 3 | 240 | 30,200 | 134,700 | 550 | 0.014 |

EXAMPLE 5

Preparation of Alloy Specimen No. 356 (Fe: 82.8%, Si: 9.7%, Al: 5.6%, La: 1.9%)

As a starting material, silicon, aluminum and electrolytic iron of the same purities as in Example 1 and lanthanum of 99.9% purity were used. The specimen was prepared in the same manner as described in Example 1 and then subjected to several heat treatments to obtain characteristic features as shown in the following Table 7.

EXAMPLE 6

Preparation of Alloy Specimen No. 360 (Fe: 81.6%, Si: 9.7%, Al: 5.5%, La: 3.2%)

As a starting material, electrolytic iron, silicon, aluminum and lanthanum of the same purities as in Example 5 were used. The specimen was prepared in the same manner as described in Example 2 and then subjected to several heat treatments to obtain characteristic features as shown in the following Table 8.

Moreover, characteristic features of representative Fe-Si-Al-La series alloys and the other representatives alloys are shown in the following Tables 9 and 10, respectively.

Table 7

| Heat treatment | Initial permeability (μ0) | Maximum permeability (μm) | Hardness (Hv) | Average grain size (mm) |
|---|---|---|---|---|
| After heated in hydrogen atmosphere at 700° C for 10 hours, cooled to room temperature at speed of 100° C/hour | 15,500 | 73,000 | 541 | 0.008 |
| After heated in hydrogen atmosphere at 800° C for 5 hours, cooled to room temperature at speed of 240° C/hour | 27,000 | 93,500 | 535 | 0.008 |
| After heated in hydrogen atmosphere at 900° C for 3 hours, cooled to room temperature at speed of 100° C/hour | 35,300 | 122,000 | 535 | 0.009 |
| After heated in hydrogen atmosphere at 1,000° C for 2 hours, cooled to room temperature at speed of 100° C/hour | 39,000 | 148,200 | 528 | 0.010 |
| After heated in hydrogen atmosphere at 1,100° C for 3 hours, cooled to room temperature at speed of 150° C/hour | 44,800 | 159,000 | 525 | 0.010 |
| After heated in hydrogen atmosphere at 1,200° C for 1 hour, cooled to room temperature at speed of 240° C/hour | 41,600 | 146,000 | 523 | 0.013 |

Table 8

| Heat treatment | Initial permeability (μ0) | Maximum permeability (μm) | Hardness (Hv) | Average grain size (mm) |
|---|---|---|---|---|
| Casting state | 11,600 | 44,000 | 552 | 0.005 |
| After heated in hydrogen atmosphere at 700° C for 10 hours, cooled to room temperature at speed of 100° C/hour | 14,500 | 62,000 | 548 | 0.005 |
| After heated in hydrogen atmosphere at 900° C for 5 hours, cooled to room temperature at speed of 240° C/hour | 29,000 | 94,000 | 545 | 0.006 |
| After heated in hydrogen atmosphere at 1,000° C for 3 hours, cooled to room temperature at speed of 150° C/hour | 35,200 | 123,000 | 539 | 0.007 |
| After heated in hydrogen atmosphere at 1,100° C for 2 hours, cooled to room temperature at speed of 240° C/hour | 41,200 | 156,000 | 537 | 0.008 |
| After heated in hydrogen atmosphere at 1,200° C for 2 hours, cooled to room temperature at speed of 100° C/hour | 36,900 | 139,000 | 535 | 0.009 |

Table 9(a)

| Specimen No. | Fe (%) | Si (%) | Al (%) | La (%) | Subingredients (%) | Heated condition Temperature (° C) | Time (hr) | Cooling rate (° C/hr) | Initial permeability (μ0) | Maximum permeability (μm) | Hardness (Hv) | Average grain size (mm) |
|---|---|---|---|---|---|---|---|---|---|---|---|---|
| 335 | 84.9 | 9.5 | 5.5 | 0.1 | — | 1,100 | 3 | 240 | 35,800 | 123,000 | 498 | 0.90 |
| 342 | 84.0 | 9.8 | 5.7 | 0.5 | — | " | 2 | 150 | 37,300 | 138,000 | 507 | 0.062 |
| 349 | 83.4 | 10.1 | 5.5 | 1.0 | — | " | 3 | 100 | 39,200 | 153,600 | 519 | 0.013 |
| 356 | 82.8 | 9.7 | 5.6 | 1.9 | — | " | 3 | 150 | 44,800 | 159,000 | 525 | 0.010 |
| 360 | 81.6 | 9.7 | 5.5 | 3.2 | — | " | 2 | 240 | 41,200 | 156,000 | 537 | 0.008 |

Table 9(a)-continued

| Specimen No. | Fe (%) | Si (%) | Al (%) | La (%) | Subingredients (%) | Heated condition: Temperature (° C) | Heated condition: Time (hr) | Cooling rate (° C/hr) | Initial permeability (μ0) | Maximum permeability (μm) | Hardness (Hv) | Average grain size (mm) |
|---|---|---|---|---|---|---|---|---|---|---|---|---|
| 363 | 80.3 | 9.2 | 4.7 | 5.8 | — | " | 2 | 150 | 15,500 | 63,000 | 565 | 0.005 |
| 372 | 82.3 | 9.6 | 5.3 | 1.5 | 1.3 V | 1,150 | 2 | 100 | 33,600 | 155,000 | 533 | 0.014 |
| 378 | 81.9 | 9.8 | 5.9 | 1.3 | 1.1 Nb | " | 3 | 150 | 38,800 | 136,000 | 536 | 0.010 |
| 384 | 80.9 | 9.9 | 5.2 | 2.0 | 2.0 Ta | " | 3 | 100 | 40,000 | 141,000 | 525 | 0.011 |
| 390 | 82.2 | 10.1 | 5.0 | 1.7 | 1.0 Cr | " | 3 | 150 | 45,500 | 123,000 | 519 | 0.013 |
| 396 | 81.2 | 9.3 | 5.8 | 2.0 | 1.7 Mo | " | 2 | 240 | 44,200 | 124,000 | 528 | 0.008 |
| 403 | 80.7 | 9.7 | 4.8 | 1.8 | 3.0 W | " | 2 | 150 | 41,000 | 143,000 | 528 | 0.010 |
| 410 | 80.5 | 8.2 | 5.7 | 2.6 | 3.0 Ni | 1,050 | 5 | 50 | 37,000 | 125,000 | 529 | 0.008 |
| 417 | 80.7 | 9.7 | 5.6 | 1.5 | 2.5 Cu | " | 3 | 240 | 34,000 | 142,000 | 510 | 0.010 |
| 420 | 79.9 | 9.3 | 5.8 | 2.0 | 3.0 Co | " | 3 | 400 | 28,200 | 145,000 | 538 | 0.012 |
| 424 | 80.0 | 9.4 | 5.9 | 1.7 | 3.0 Mn | 1,100 | 3 | 150 | 46,000 | 169,000 | 525 | 0.010 |
| 428 | 80.8 | 10.2 | 5.0 | 2.5 | 1.5 Ge | " | 2 | 240 | 42,100 | 150,000 | 536 | 0.009 |
| 436 | 81.5 | 9.3 | 6.2 | 1.5 | 1.5 Ti | " | 2 | 400 | 38,500 | 144,300 | 545 | 0.010 |

Table 9(b)

| Specimen No. | Fe (%) | Si (%) | Al (%) | La (%) | Subingredients (%) | Heated condition: Temperature (° C) | Heated condition: Time (hr) | Cooling rate (° C/hr) | Initial permeability (μ0) | Maximum permeability (μm) | Hardness (Hv) | Average grain size (mm) |
|---|---|---|---|---|---|---|---|---|---|---|---|---|
| 441 | 81.7 | 9.6 | 5.9 | 1.8 | 1.0 Zr | 1,100 | 3 | 150 | 37,200 | 131,000 | 550 | 0.013 |
| 445 | 81.5 | 9.3 | 6.0 | 2.0 | 1.2 Sn | " | 2 | 240 | 33,100 | 120,000 | 540 | 0.011 |
| 451 | 81.5 | 9.0 | 6.0 | 2.5 | 1.0 Sb | " | 2 | 150 | 34,800 | 134,000 | 539 | 0.007 |
| 457 | 82.4 | 9.3 | 6.2 | 1.8 | 0.3 Be | " | 3 | 100 | 35,500 | 123,500 | 538 | 0.013 |
| 462 | 81.9 | 9.2 | 5.8 | 3.0 | 0.1 Pb | " | 2 | 100 | 37,500 | 154,000 | 535 | 0.012 |
| 465 | 79.9 | 10.0 | 4.9 | 2.2 | 0.5 V, 1.0 Mo, 1.0 Mn, 0.5 Ti | 1,150 | 3 | 400 | 39,500 | 138,200 | 551 | 0.014 |
| 470 | 80.2 | 9.5 | 5.4 | 2.5 | 0.5 Nb, 1.0 Cr, 0.5 Mn. 0.3 Zr, 0.1 Pb | " | 2 | 240 | 39,500 | 145,000 | 534 | 0.013 |
| 474 | 78.1 | 9.7 | 6.0 | 1.9 | 2.0 Ta, 1.0 W, 1.0 Co, 0.3 Sn | " | 1 | 150 | 44,100 | 135,000 | 532 | 0.015 |
| 479 | 80.4 | 9.3 | 5.6 | 2.0 | 0.5 Nb, 2.0 Cu, 0.2 Be | " | 1 | 100 | 42,500 | 128,500 | 545 | 0.013 |
| 483 | 78.2 | 9.8 | 6.0 | 2.5 | 1.0 Mo, 2.0 Cu, 0.5 Ge | " | 1 | 400 | 39,300 | 125,000 | 547 | 0.012 |

Table 10(a)

| Specimen No. | Fe (%) | Si (%) | Al (%) | Other main ingredients (%) | Subingredients (%) | Heated condition: Temperature (° C) | Heated condition: Time (hr) | Cooling rate (° C/hr) | Initial permeability (μ0) | Maximum permeability (μm) | Hardness (Hv) | Average grain size (mm) |
|---|---|---|---|---|---|---|---|---|---|---|---|---|
| 490 | 83.8 | 9.8 | 5.4 | 1.0 Pr | — | 1,100 | 3 | 240 | 37,600 | 125,800 | 521 | 0.015 |
| 494 | 83.4 | 9.6 | 5.5 | 1.5 Sm | — | " | 3 | 150 | 36,800 | 119,200 | 532 | 0.013 |
| 498 | 83.7 | 9.4 | 5.7 | 1.2 Gd | — | " | 3 | 240 | 39,500 | 135,100 | 525 | 0.14 |
| 504 | 84.0 | 9.7 | 5.3 | 1.0 Nd | — | " | 2 | 240 | 44,500 | 152,300 | 520 | 0.016 |
| 510 | 83.2 | 10.1 | 5.2 | 1.5 Pm | — | " | 3 | 400 | 36,100 | 121,000 | 525 | 0.015 |
| 515 | 83.7 | 9.3 | 5.5 | 1.5 Eu | — | " | 2 | 150 | 38,400 | 125,600 | 532 | 0.013 |
| 522 | 83.1 | 9.2 | 5.7 | 2.0 Tb | — | 1,150 | 2 | 100 | 41,600 | 147,000 | 528 | 0.010 |
| 529 | 82.8 | 9.9 | 5.5 | 1.8 Dy | — | " | 2 | 400 | 39,200 | 122,000 | 535 | 0.008 |
| 535 | 82.9 | 9.4 | 5.7 | 2.0 Ho | — | " | 3 | 240 | 45,200 | 153,600 | 530 | 0.007 |
| 543 | 83.8 | 8.7 | 6.0 | 1.5 Er | — | " | 2 | 100 | 36,300 | 121,000 | 536 | 0.010 |
| 550 | 83.5 | 9.3 | 6.2 | 1.0 Tm | — | " | 3 | 100 | 38,800 | 143,700 | 529 | 0.013 |
| 556 | 83.5 | 8.5 | 6.0 | 2.0 Yb | — | " | 3 | 240 | 42,700 | 142,000 | 525 | 0.007 |
| 561 | 83.4 | 9.3 | 5.8 | 1.5 Lu | — | 1,100 | 3 | 400 | 38,500 | 103,500 | 521 | 0.010 |
| 570 | 81.6 | 9.3 | 5.6 | 2.0 Y, 1.5 Gd | — | " | 3 | 100 | 44,700 | 163,000 | 540 | 0.013 |
| 574 | 82.0 | 9.7 | 5.3 | 0.5 Sm, 0.5 Nd | 0.5 V, 0.5 W, 1.0 Mn | " | 3 | 150 | 34,200 | 113,900 | 538 | 0.012 |
| 579 | 79.9 | 10.1 | 6.5 | 0.5 Dy, 0.5 Tm | 1.0 Ge, 1.0 Ni, 0.5 Sn | " | 3 | 400 | 27,000 | 86,200 | 532 | 0.013 |

Table 10(b)

| Specimen No. | Fe (%) | Si (%) | Al (%) | Other main ingredients (%) | Subingredients (%) | Heated condition: Temperature (° C) | Heated condition: Time (hr) | Cooling rate (° C/hr) | Initial permeability (μ0) | Maximum permeability (μm) | Hardness (Hv) | Average grain size (mm) |
|---|---|---|---|---|---|---|---|---|---|---|---|---|
| 583 | 81.4 | 9.6 | 5.8 | 0.5 Gd, 0.5 Er | 1.0 Ni, 1.0 Co, 0.2 Be | 1,100 | 2 | 240 | 41,300 | 135,000 | 528 | 0.010 |
| 588 | 86.5 | 6.2 | 4.3 | 1.5 Y, 0.5 Ho | 1.0 Mn | 1,050 | 5 | 100 | 3,500 | 64,500 | 535 | 0.016 |
| 594 | 86.5 | 5.5 | 5.0 | 1.0 Ce, 0.5 Pm | 1.0 Co, 0.5 Sn | " | 5 | 50 | 3,700 | 86,000 | 538 | 0.018 |
| 600 | 85.5 | 7.4 | 4.6 | 0.5 La, 0.5 Gd | 0.5 Nb, 1.0 Ni | " | 5 | 100 | 14,900 | 72,400 | 542 | 0.015 |
| 606 | 85.2 | 3.8 | 8.5 | 0.5 Pr, 0.5 Sm | 0.5 Ti, 1.0 Co | " | 5 | 240 | 13,600 | 91,600 | 530 | 0.016 |
| 612 | 80.9 | 9.7 | 5.0 | 1.0 Y, 1.3 Ce | 1.0 Ge, 0.3 Be | 1,100 | 3 | 240 | 40,800 | 165,000 | 552 | 0.013 |
| 627 | 79.6 | 9.2 | 5.7 | 1.0 Y, 2.0 Yb | 0.5 Nb, 2.0 W | " | 3 | 240 | 35,000 | 166,000 | 536 | 0.012 |
| 633 | 81.9 | 9.5 | 5.3 | 1.5 Y, 1.0 Eu | 1.5 Ti, 0.2 Be 0.1 Pb | " | 3 | 240 | 41,300 | 158,200 | 546 | 0.013 |
| 641 | 82.1 | 8.8 | 4.9 | 1.0 Ce, 1.5 La | 0.5 V, 0.7 Cr, 0.5 Mn | " | 3 | 240 | 40,600 | 124,000 | 535 | 0.008 |
| 647 | 80.8 | 9.3 | 5.4 | 1.8 Ce, 1.0 Pr | 1.0 Ta, 0.7 Ge | " | 2 | 100 | 42,500 | 131,000 | 528 | 0.007 |
| 653 | 80.4 | 9.0 | 6.2 | 1.0 Ce, 1.5 Sm | 1.0 W, 0.8 Mn, | " | 3 | 100 | 39,700 | 116,000 | 517 | 0.009 |

Table 10(b)-continued

| Specimen No. | Fe (%) | Si (%) | Al (%) | Other main ingredients (%) | Subingredients (%) | Heated condition Temperature (° C) | Heated condition Time (hr) | Cooling rate (° C/hr) | Initial permeability (μ0) | Maximum permeability (μm) | Hardness (Hv) | Average grain size (mm) |
|---|---|---|---|---|---|---|---|---|---|---|---|---|
| | | | | | 0.1 Pb | | | | | | | |
| 660 | 81.4 | 9.3 | 5.8 | 0.5 Ce, 2.0 Yb | 0.5 Mo, 0.2 Sn, 0.3 Sb | " | 2 | 240 | 41,600 | 127,100 | 513 | 0.005 |
| 664 | 81.2 | 8.5 | 6.1 | 1.0 Ce, 1.7 Eu | 1.0 W, 0.5 Ti | " | 3 | 100 | 36,300 | 125,700 | 526 | 0.006 |

Table 10(c)

| Specimen No. | Fe (%) | Si (%) | Al (%) | Other main ingredients (%) | Subingredients (%) | Heated condition Temperature (° C) | Heated condition Time (hr) | Cooling rate (° C/hr) | Initial permeability (μ0) | Maximum permeability (μm) | Hardness (Hv) | Average grain size (mm) |
|---|---|---|---|---|---|---|---|---|---|---|---|---|
| 672 | 81.5 | 8.7 | 5.8 | 1.2 Ce, 1.0 Gd | 1.0 Ni, 0.3 Mn, 0.5 Zr | 1,100 | 3 | 100 | 42,600 | 113,600 | 521 | 0.009 |
| 680 | 81.9 | 9.0 | 5.3 | 0.7 Ce, 2.0 Nd | 1.0 Cu, 0.1 Be | " | 3 | 240 | 37,200 | 121,000 | 534 | 0.008 |
| 684 | 80.4 | 9.6 | 5.5 | 1.5 Ce, 1.0 Tb | 1.0 Cr, 1.0 Co | 1,150 | 2 | 240 | 33,500 | 134,000 | 520 | 0.010 |
| 689 | 79.9 | 9.2 | 5.7 | 2.4 La, 0.5 Ho | 1.5 Ni, 0.3 Mn, 0.5 Sb | " | 2 | 240 | 37,200 | 134,700 | 558 | 0.014 |
| 694 | 80.1 | 9.8 | 4.9 | 1.5 La, 1.0 Dy | 0.5 V, 0.7 Cr, 1.5 Mn | 1,100 | 3 | 240 | 40,900 | 131,000 | 545 | 0.007 |
| 703 | 80.1 | 10.0 | 5.2 | 1.3 La, 1.5 Sm | 1.0 W, 0.8 Mn, 0.1 Pb | " | 2 | 100 | 35,600 | 136,000 | 519 | 0.008 |
| 710 | 81.0 | 9.7 | 5.8 | 0.5 La, 2.0 Yb | 0.2 Mo, 0.2 Sn, 0.3 Sb | " | 3 | 240 | 40,800 | 147,500 | 523 | 0.005 |
| 714 | 81.2 | 9.7 | 4.8 | 1.5 La, 1.0 Gd | 1.0 Ni, 0.3 Mn, 0.5 Zr | " | 3 | 150 | 43,500 | 133,100 | 539 | 0.006 |
| 719 | 83.7 | 8.6 | 6.2 | 0.5 Y, 0.5 Sm, 0.5 Eu | — | 1,050 | 5 | 400 | 41,500 | 161,000 | 536 | 0.012 |
| 724 | 81.1 | 9.0 | 5.8 | 0.7 La, 0.3 Pm, 2.0 Nd | 1.0 Cu, 0.1 Be | 1,150 | 2 | 400 | 45,200 | 127,000 | 543 | 0.008 |
| 737 | 79.9 | 9.6 | 5.7 | 1.5 La, 0.3 Tm, 1.0 Tb | 1.0 Cr, 1.0 Co | " | 2 | 240 | 36,500 | 132,000 | 539 | 0.007 |

Table 10(d)

| Specimen No. | Fe (%) | Si (%) | Al (%) | Other main ingredients (%) | Subingredients (%) | Heated condition Temperature (° C) | Heated condition Time (hr) | Cooling rate (° C/hr) | Initial permeability (μ0) | Maximum permeability (μm) | Hardness (Hv) | Average grain size (mm) |
|---|---|---|---|---|---|---|---|---|---|---|---|---|
| 742 | 79.8 | 9.5 | 6.0 | 1.0 La, 0.5 Er, 1.7 Eu | 1.0 W, 0.5 Ti | 1,150 | 2 | 100 | 38,600 | 135,200 | 533 | 0.005 |
| 750 | 80.1 | 9.7 | 5.4 | 1.8 La, 1.0 Pr, 0.3 Lu | 1.0 Ta, 0.7 Ge | " | 3 | 150 | 43,500 | 127,000 | 538 | 0.007 |
| 756 | 81.8 | 9.2 | 6.2 | 0.5 Nd, 0.5 Ho, 0.3 Yb | 1.0 Cu, 0.5 Zr | " | 3 | 400 | 32,600 | 124,200 | 541 | 0.012 |
| 760 | 84.2 | 9.6 | 4.2 | 0.5 Y, 0.2 Pm, 0.3 Ho | 0.5 Nb, 0.5 Cr | " | 2 | 240 | 36,000 | 134,400 | 533 | 0.013 |
| 764 | 83.5 | 9.2 | 5.8 | 0.5 Pr, 0.5 Gd, 0.3 Dy, 0.5 Tm | — | " | 2 | 100 | 35,700 | 123,500 | 532 | 0.008 |
| 769 | 84.0 | 9.9 | 4.3 | 0.5 Nd, 0.5 Pm, 0.5 Tb, 0.3 Lu | — | 1,100 | 3 | 100 | 28,200 | 116,000 | 543 | 0.010 |
| 773 | 82.4 | 11.1 | 5.0 | 0.3 Ho, 0.5 Er, 0.5 Yb, 0.2 Eu | — | " | 3 | 50 | 37,600 | 143,600 | 538 | 0.011 |
| 780 | 83.7 | 8.2 | 6.3 | 0.3 Ce, 0.3 Pr, 0.2 Tb, 0.2 Er | 0.3 Ta, 0.5 Mo | " | 3 | 240 | 37,900 | 127,400 | 541 | 0.010 |
| 785 | 83.2 | 9.5 | 5.8 | 0.3 La, 0.3 Nd, 0.3 Tm, 0.2 Yb | 0.3 Ti, 0.1 Pb | " | 2 | 400 | 43,600 | 141,600 | 536 | 0.008 |
| 790 | 82.5 | 10.3 | 5.5 | 0.5 Ce, 0.5 La, 0.2 Dy, 0.2 Tm, 0.3 Lu | — | " | 2 | 100 | 45,700 | 127,000 | 545 | 0.010 |

As seen from the above Tables 1–10, the alloys of the invention has an initial permeability of more than 1,000, a maximum permeabilityof more than 3,000, a hardness of more than 490 (Hv), and an average size of smaller than 2 mm. Furthermore, the addition of V, Nb, Ta, Cr, Mo, W, Cu, Ni, Co, Mn, Ge or Ti to said alloy is effective to enhance the initial and maximum permeabilities, and the addition of V, Nb, Ta, Ti, Zr, Sn, Sb or Be is effective to enhance the hardness, and the addition of V, Nb, Ta, Mo, Mn, Ge, Ti, Zr or Pb is effective to make the grain size fine.

For instance, the alloy consisting of 81.8% of Fe, 10.0% of Si, 5.5% of Al, 1.2% of Y and 1.5% of Mo (Alloy Specimen No. 63 of Table 3) exhibits the initial permeability of 45,700 and the maximum permeability of 182,000 and has the hardness of 525 (Hv) and the average grain size of 0.015 mm when it is heated at 1,150° C for 3 hours and then cooled to room temperature at a rate of 300° C/hr. Furthermore, the alloy consisting of 81.8% of Fe, 9.2% of Si, 5.3% of Al, 2.2% of Ce and 1.5% of Ge (Alloy Specimen No. 270 of Table 6) exhibits the initial permeability of 45,100 and the maximum permeability of 153,000 and has the hardness of 526 (Hv) and the average grain size of 0.009 mm when it is heated at 1,100° C for 3 hours and then cooled to room temperature at a rate of 240° C/hr. Moreover, the alloy consisting of 80.0% of Fe, 9.4% of Si, 5.9% of Al, 1.7% of La and 3.0% of Mn (Alloy Specimen No. 424 of Table 9) exhibits the initial permeability of 46,000 and the maximum permeability of 169,000 and has the hardness of 525 (Hv) and the average grain size of 0.010 mm. That is, these alloys are high in the permeabilities and hardness and very fine in the grain size as compared with the well-known Sendust consisting of 85.0% of Fe, 9.6% of Si and 5.4% of Al and having the initial permeability of 35,000, the maximum permeability of 118,000, the hardness of 490 (Hv) and the average grain size of 5 mm.

In the alloys shown in Examples 1 to 6, and Tables 3, 6, 9 and 10, metals having a relatively high purity, such as Y, Si, Al, V, Nb, Cr, Mo, W, Ni, Mn, Ti, Be and lanthanum series elements are used, but commercially available ferro-alloys, various mother alloys and Misch metal may be used instead of said metals.

Moreover, since yttrium and lanthanum series elements are produced together in nature, commercially available simple element may contains a small amount of the other simple elements. Even if a mixture of these simple elements is used in the present invention, magnetic properties, hardness and grain size of the resulting alloy are not effected seriously.

In the conventional Fe-Si-Al series alloys, the composition range exhibiting a high permeability is narrow, but when at least one element selected from yttrium and lanthanum series elements is added to such an alloy, then the permeability further increases and a high permeability can be obtained over a wide composition range, so that it is commercially advantageous.

FIGS. 1, 2 and 3 show the initial and maximum permeabilities when yttrium, cerium and lanthanum are added to 10.8% Si-5,5% Al-Fe series alloys, respectively. As seen from these figures, it can be seen that the initial and maximum permeabilities are increased by the addition of each of yttrium, cerium and lanthanum. This is considered to be due to the fact that magnetostriction and magnetic anisotrophy become smaller and the element added is effectively acted as a deoxidizer.

In the operation of magnetic sound and video recording systems, a magnetic tape is closely run to a magnetic head, so that wearing of the magnetic head is caused and the sound or video quality is impaired. Therefore, it is desirable that the hardness is high, the grain size if fine, and the wear resistance is excellent as far as possible in the alloy for magnetic head.

As seen from FIGS. 4, 5 and 6, in the 10.0% Si-5.5% Al-84.5% Fe alloy, the Vickers hardness Hv is 490 and the grain size is very large, buy by adding each of yttrium, cerium and lanthanum to said alloy, the hardness increases and the grain size becomes very fine. In general, it is known that in the Sendust series alloys the wear resistance is improved as the grain size becomes fine (Japanese Patent Application Publication No. 27,142/71). The alloy of the present invention has a very fine grain size as mentioned above, so that the wear loss of the magnetic head to the magnetic tape is very small and the wear resistance is considerably improved. Such as excellent wear resistance is a significant feature of the present invention. Furthermore, in the alloy of the invention the hardness is high, so that cracks and the like are not caused during the manufacture of magnetic heads.

Generally, an eddy current is generated in magnetic materials under an influence of an alternating magnetic field, whereby the permeability of magnetic material is lowered. However, the eddy current becomes small as the electric resistance is larger and the grain is smaller. Therefore, the permeability of the alloy according to the invention is high in the alternating magnetic field because of the fine grain size, so that the alloy of the invention is not only preferable as a magnetic material for magnetic head to be used in the alternating magnetic field, but also is used as magnetic materials for common electrical machinery and apparatus.

Next, in the present invention, the reason why the composition of the alloy is limited to the ranges as mentioned above is as follows. That is, as understood from each Example, Tables 3, 6, 9 and 10, and FIGS. 1-6, alloys having an initial permeability of more than 1,000, a maximum permeability of more than 3,000, a hardness of more than 490 (Hv) and an average grain size of smaller than 2 mm can be first obtained within the above mentioned composition ranges. When the contents of silicon and aluminum are less than 3% and exceeds 13%, respectively, the initial permeability becomes less than 1,000, the maximum permeability becomes less than 3,000, the hardness is low and the wear resistance is poor. Furthermore, when the content of at least one element selected from yttrium and lanthanum series elements is less than 0.01%, the addition effect is very small and the average grain size is larger than 2 mm and hence the workability is poor, while when the content exceeds 7%, the addition effect is unchanged.

Furthermore, when the content of each of the subingredients is beyond the above mentioned range, the initial permeability becomes less than 1,000 and the maximum permeability becomes less than 3,000, so that the resulting alloy is unsuitable as a wear-resistant high-permeability alloy.

What is claimed is:

1. A heat treated, wear-resistant high-permeability alloy having an initial permeability of more than 1,000, a maximum permeability of more than 3,000, a hardness of more than 490 (Hv) and an average grain size of smaller than 2 mm, and consisting of by weight 3–13% of silicon, 3–13% of aluminum, 0.01–7% of at least one element selected from yttrium and lanthanum series elements and remainder of iron.

2. A heat treated, wear-resistant high-permeability alloy as defined in claim 1, wherein said lanthanum series element is selected from lanthanum, cerium, praseodymium, neodymium, promethium, samarium, europium, gadolinium, terbium, dysprosium, holmium, erbium, thulium, ytterbium and lutetium.

3. A heat treated, wear-resistant high-permeability alloy as defined in claim 1, wherein the alloy consists of by weight 5–12% of silicon, 4–8% of aluminum, 0.05–6% of at least one element selected from yttrium and lanthanum series elements and remainder of iron.

4. A heat treated, wear-resistant high-permeability alloy having an initial permeability of more than 1,000, a maximum permeability of more than 3,000, a hardness of more than 490 (Hv) and an average grain size of smaller than 2 mm, and consisting of by weight 3–13% of silicon, 3–13% of aluminum, 0.01–7% of at least one element selected from yttrium and lanthanum series elements and remainder of iron as main ingredients and containing at least one element selected from the group consisting of 0–5% of vanadium, 0–5% of niobium, 0–5% of tantalum, 0–5% of chromium, 0–5% of molybdenum, 0–5% of tungsten, 0–5% of copper, 0–5% of germanium, 0–5% of titanium, 0–7% of nickel, 0–7% of cobalt, 0–7% of manganese, 0–3% of zirconium, 0–3% of tin, 0–3% of antimony, 0–3% of beryllium and 0–0.3% of lead as subingredients, said subingredients in total being in a range of 0.01–7% by weight of the total alloy.

5. A heat treated, wear-resistant high-permeability alloy as defined in claim 4, wherein said lanthanum series element is selected from lanthanum, cerium, praseodymium, neodymium, promethium, samarium, europium, gadolinium, terbium, dysprosium, holmium, erbium, thulium, ytterbium and lutetium.

6. A heat treated, wear-resistant high-permeability alloy as defined in claim 4, wherein the alloy consists of by weight 5–12% of silicon, 4–8% of aluminum, 0.05–6% of at least one element selected from yttrium and lanthanum series elements and remainder of iron as main ingredients and contains at least one element selected from the group consisting of 0–4% of vanadium, 0–4% of niobium, 0–4% of tantalum, 0–4% of chromium, 0–4% of molybdenum, 0–4% of tungsten, 0–4% of copper, 0–4% of germanium, 0–4% of titanium, 0–5% of nickel, 0–5% of cobalt, 0–5% of manganese, 0–2% of zirconium, 0–2% of tin, 0–2% of antimony, 0–2% of beryllium and 0–0.2% of lead as subingredients, said subingredients in total being a range of 0.01–7% by weight of the total alloy.

7. A wear-resistant high-permeability alloy having an initial permeability of more than 1,000, a maximum permeability of more than 3,000, a high hardness and a fine grain size, and consisting of by weight 3–13% of silicon, 3–10% of aluminum, 0.01–7% of yttrium and 70–94% of iron.

8. A wear-resistant high-permeability alloy having an initial permeability of more than 1,000, a maximum permeability of more than 3,000, a high hardness and a fine grain size, and consisting of by weight 3–13% of silicon, 3–10% of aluminum, 0.01–7% of yttrium and 70–94% of iron as main ingredients and containing 0.01–7% by weight in total of at least one element selected from the group consisting of 0–5% of vanadium, 0–5% of niobium, 0–5% of tantalum, 0–5% of chromium, 0–5% of molybdenum, 0–5% of tungsten, 0–5% of copper, 0–5% of germanium, 0–5% of titanium, 0–7% of nickel, 0–7% of cobalt, 0–7% of manganese, 0–3% of zirconium, 0–3% of tin, 0–3% of antimony, 0–3% of beryllium and 0–0.3% of lead as subingredients.

9. A wear-resistant high-permeability alloy having an initial permeability of more than 1,000, a maximum permeability of more than 3,000, a high hardness and a fine grain size, and consisting of by weight 3–13% of silicon, 3–13% of aluminum, 0.01–7% of cerium and remainder of iron.

10. A wear-resistant high-permeability alloy having an initial permeability of more than 1,000, a maximum permeability of more than 3,000, a high hardness and a fine grain size, and consisting of by weight 3–13% of silicon, 3–13% of aluminum, 0.01–7% of cerium and remainder of iron as main ingredients and containing 0.01–7% by weight in total of at least one element selected from the group consisting of 0–5% of vanadium, 0–5% of niobium, 0–5% of tantalum, 0–5% of chromium, 0–5% of molybdenum, 0–5% of tungsten, 0–5% of copper, 0–5% of germanium, 0–5% of titanium, 0–7% of nickel, 0–7% of cobalt, 0–7% of manganese, 0–3% of zirconium, 0–3% of tin, 0–3% of antimony, 0–3% of beryllium and 0–0.3% of lead as subingredients.

11. A wear-resistant high-permeability alloy having an initial permeability of more than 1,000, a maximum permeability of more than 3,000, a high hardness and a fine grain size, and consisting of by weight 3–13% of silicon, 3–13% of aluminum, 0.01–7% of lanthanum and remainder of iron.

12. A wear-resistant high-permeability alloy having an initial permeability of more than 1,000, a maximum permeability of more than 3,000, a high hardness and a fine grain size, and consisting of by weight 3–13% of silicon, 3–13% of aluminum, 0.01–7% of lanthanum and remainder of iron as main ingredients and containing 0.01–7% by weight in total of at least one element selected from the group consisting of 0–5% of vanadium, 0–5% of niobium, 0–5% of tantalum, 0–5% of chromium, 0–5% of molybdenum, 0–5% of tungsten, 0–5% of copper, 0–5% of germanium, 0–5% of titanium, 0–7% of nickel, 0–7% of cobalt, 0–7% of manganese, 0–3% of zircnoum, 0–3% of tin, 0–3% of antimony, 0–3% of beryllium and 0–0.3% of lead as subingredients.

* * * * *